US010885399B2

United States Patent
Zhou et al.

(10) Patent No.: US 10,885,399 B2
(45) Date of Patent: ***Jan. 5, 2021

(54) DEEP IMAGE-TO-IMAGE NETWORK LEARNING FOR MEDICAL IMAGE ANALYSIS

(71) Applicant: Siemens Healthcare GmbH, Erlangen (DE)

(72) Inventors: S. Kevin Zhou, Plainsboro, NJ (US); Dorin Comaniciu, Princeton Junction, NJ (US); Bogdan Georgescu, Plainsboro, NJ (US); Yefeng Zheng, Princeton Junction, NJ (US); David Liu, Plano, TX (US); Daguang Xu, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 196 days.

This patent is subject to a terminal disclaimer.

(21) Appl. No.: 16/042,538

(22) Filed: Jul. 23, 2018

(65) Prior Publication Data
US 2018/0330207 A1 Nov. 15, 2018

Related U.S. Application Data

(63) Continuation of application No. 15/618,384, filed on Jun. 9, 2017, now Pat. No. 10,062,014, which is a
(Continued)

(51) Int. Cl.
*G06K 9/66* (2006.01)
*G06T 7/00* (2017.01)
(Continued)

(52) U.S. Cl.
CPC .............. *G06K 9/66* (2013.01); *G06K 9/4609* (2013.01); *G06K 9/4628* (2013.01);
(Continued)

(58) Field of Classification Search
CPC ...... G06K 9/66; G06K 9/4609; G06K 9/4628; G06K 9/6297; G06T 7/143; G06T 7/11;
(Continued)

(56) References Cited

U.S. PATENT DOCUMENTS 7,317,821 B2 * 1/2008 Chen .................... G06K 9/00
382/130
7,340,081 B2 * 3/2008 Chen .................... G06T 7/0012
382/128

(Continued)

OTHER PUBLICATIONS

Wang et al., 2012, "Machine Learning and Radiology" (pp. 1-44) (Year: 2012).*
(Continued)

*Primary Examiner* — Manav Seth

(57) ABSTRACT

A method and apparatus for automatically performing medical image analysis tasks using deep image-to-image network (DI2IN) learning. An input medical image of a patient is received. An output image that provides a result of a target medical image analysis task on the input medical image is automatically generated using a trained deep image-to-image network (DI2IN). The trained DI2IN uses a conditional random field (CRF) energy function to estimate the output image based on the input medical image and uses a trained deep learning network to model unary and pairwise terms of the CRF energy function. The DI2IN may be trained on an image with multiple resolutions. The input image may be split into multiple parts and a separate DI2IN may be trained for each part. Furthermore, the multi-scale and multi-part schemes can be combined to train a multi-scale multi-part DI2IN.

22 Claims, 6 Drawing Sheets

Related U.S. Application Data continuation of application No. 15/382,414, filed on Dec. 16, 2016, now Pat. No. 9,760,807.

(60) Provisional application No. 62/276,309, filed on Jan. 8, 2016.

(51) Int. Cl.
*G06T 7/174* (2017.01)
*G06T 7/11* (2017.01)
*G06K 9/46* (2006.01)
*G06K 9/62* (2006.01)
*G06T 7/143* (2017.01)

(52) U.S. Cl.
CPC .......... *G06K 9/6297* (2013.01); *G06T 7/0014* (2013.01); *G06T 7/11* (2017.01); *G06T 7/143* (2017.01); *G06T 7/174* (2017.01); *G06T 2207/10072* (2013.01); *G06T 2207/10136* (2013.01); *G06T 2207/20016* (2013.01); *G06T 2207/20081* (2013.01); *G06T 2207/30004* (2013.01); *G06T 2207/30056* (2013.01); *G06T 2207/30096* (2013.01)

(58) Field of Classification Search
CPC ................. G06T 7/174; G06T 7/0014; G06T 2207/10072; G06T 2207/10136; G06T 2207/20016; G06T 2207/20081; G06T 2207/30004; G06T 2207/30056; G06T 2207/30096
See application file for complete search history.

(56) References Cited

U.S. PATENT DOCUMENTS

| | | | | |
|---|---|---|---|---|
| 7,616,794 B2* | 11/2009 | Moeller | ................ | G06K 9/342 382/128 |
| 7,668,351 B1* | 2/2010 | Soliz | ................ | G06T 7/155 382/128 |
| 7,672,493 B2* | 3/2010 | Qing | ................ | G06T 7/12 382/128 |
| 7,680,312 B2* | 3/2010 | Jolly | ................ | G06T 7/149 382/128 |
| 7,764,816 B2* | 7/2010 | Shen | ................ | G06T 7/181 382/128 |
| 7,783,094 B2* | 8/2010 | Collins | ................ | G06F 19/00 382/128 |
| 7,903,854 B2* | 3/2011 | Sakaida | ................ | G06F 19/321 382/128 |
| 8,014,576 B2* | 9/2011 | Collins | ................ | G01R 33/5601 382/128 |
| 8,027,521 B1* | 9/2011 | Moon | ................ | G06K 9/00288 382/118 |
| 8,126,229 B2* | 2/2012 | Ghanem | ................ | G06T 7/0012 382/128 |
| 8,238,637 B2* | 8/2012 | Ratner | ................ | G06T 7/0012 382/132 |
| 8,244,015 B2* | 8/2012 | Sirohey | ................ | A61B 6/504 382/130 |
| 8,331,637 B2* | 12/2012 | Bar-Aviv | ................ | G06T 7/75 382/128 |
| 8,391,574 B2* | 3/2013 | Collins | ................ | A61B 6/5247 382/128 |
| 8,483,467 B2* | 7/2013 | Mizuno | ................ | G06T 7/0012 382/131 |
| 9,275,308 B2 | 3/2016 | Szegedy et al. | | |
| 9,373,059 B1 | 6/2016 | Heifets et al. | | |
| 9,430,697 B1* | 8/2016 | Iliadis | ................ | G06K 9/00221 |
| 9,530,082 B2* | 12/2016 | Abdulkader | ................ | G06K 9/66 |
| 9,558,268 B2* | 1/2017 | Tuzel | ................ | G06K 9/00523 |
| 9,668,699 B2* | 6/2017 | Georgescu | ................ | G06K 9/6255 |
| 9,684,851 B2* | 6/2017 | Abdulkader | ................ | G06K 9/34 |
| 9,710,880 B2* | 7/2017 | Xu | ................ | G06T 11/003 |
| 9,760,807 B2* | 9/2017 | Zhou | ................ | G06T 7/0014 |
| 9,792,531 B2* | 10/2017 | Georgescu | ................ | A61B 6/5217 |
| 9,846,938 B2* | 12/2017 | Steigauf | ................ | G06K 9/4623 |
| 9,959,486 B2* | 5/2018 | Kiraly | ................ | G06T 7/11 |
| 9,968,257 B1* | 5/2018 | Burt | ................ | A61B 5/7267 |
| 10,062,014 B2* | 8/2018 | Zhou | ................ | G06K 9/6297 |
| 10,074,038 B2* | 9/2018 | Hsieh | ................ | G06N 3/08 |
| 10,242,292 B2* | 3/2019 | Zisimopoulos | ................ | G06N 20/00 |
| 10,242,293 B2* | 3/2019 | Shim | ................ | G06T 7/0012 |
| 10,574,883 B2* | 2/2020 | Purwar | ................ | G06K 9/00281 |
| 2005/0100208 A1 | 5/2005 | Suzuki et al. | | |
| 2008/0292194 A1 | 11/2008 | Schmidt et al. | | |
| 2009/0129655 A1 | 5/2009 | Lossev et al. | | |
| 2010/0310181 A1 | 12/2010 | Djeziri et al. | | |
| 2011/0293136 A1* | 12/2011 | Porikli | ................ | G06N 20/00 382/103 |
| 2012/0072215 A1 | 3/2012 | Yu et al. | | |
| 2012/0269436 A1 | 10/2012 | Mensink et al. | | |
| 2014/0086465 A1 | 3/2014 | Wu et al. | | |
| 2015/0161101 A1 | 6/2015 | Yao et al. | | |
| 2015/0170002 A1 | 6/2015 | Szegedy et al. | | |
| 2015/0238148 A1 | 8/2015 | Georgescu et al. | | |
| 2015/0265251 A1 | 9/2015 | Cho et al. | | |
| 2016/0063359 A1 | 3/2016 | Szegedy et al. | | |
| 2016/0093048 A1 | 3/2016 | Cheng et al. | | |
| 2016/0140424 A1 | 5/2016 | Wang et al. | | |
| 2016/0174902 A1 | 6/2016 | Georgescu et al. | | |
| 2016/0180195 A1 | 6/2016 | Martinson et al. | | |
| 2016/0210749 A1 | 7/2016 | Nguyen et al. | | |
| 2016/0328643 A1 | 11/2016 | Liu et al. | | |
| 2017/0109475 A1 | 4/2017 | Kaditz et al. | | |
| 2017/0140236 A1* | 5/2017 | Price | ................ | G06K 9/3241 |
| 2017/0249739 A1* | 8/2017 | Kallenberg | ................ | G06K 9/4628 |
| 2017/0287137 A1* | 10/2017 | Lin | ................ | G06N 3/08 |
| 2018/0296193 A1* | 10/2018 | Cho | ................ | A61B 8/483 |
| 2019/0180438 A1* | 6/2019 | Buckler | ................ | G06T 7/0014 |
| 2019/0237186 A1* | 8/2019 | El-Baz | ................ | G16H 30/40 |

OTHER PUBLICATIONS

Liu, Sifei et al., "Multi-Objective Convolutional Learning for Face Labeling", Proceedings of the IEEE Conference on Computer Vision and Pattern Recognition (CVPR), 2015, pp. 3451-3459.

Tsogkas, Stavros, et al., "Deep learning for semantic part segmentation with high-level guidance." arXiv preprint arXiv:1505.02438 (2015).

Paisitkriangkrai, Sakrapee, et al., "Effective semantic pixel labelling with convolutional networks and conditional random fields." Proceedings of the IEEE Conference on Computer Vision and Pattern Recognition Workshops, 2015, pp. 36-43.

Qi, Xiaojuan et al., "Semantic Segmentation with Object Clique Potentials", Proceedings of the IEEE Conference on Computer Vision (ICCV), 2015, pp. 2587-2595.

Farabet, Clement et al., "Learning Hierarchical features for scene labeling"; IEEE transactions on pattern analysis and machine intelligence 35.8; 2013; 1915-1929; 13 pags.

* cited by examiner

502

504

506

508

510

512

514

516

DEEP IMAGE-TO-IMAGE NETWORK LEARNING FOR MEDICAL IMAGE ANALYSIS

This application is a continuation of U.S. application Ser. No. 15/618,384, filed Jun. 9, 2017, which is a continuation of U.S. application Ser. No. 15/382,414, filed Dec. 16, 2016 and issued U.S. Pat. No. 9,760,807, which claims the benefit of U.S. Provisional Application No. 62/276,309, filed Jan. 8, 2016, the disclosures of which are herein incorporated by reference.

BACKGROUND OF THE INVENTION

The present invention relates to automated analysis of medical images, and more particularly, to automating various medical image analysis tasks using deep image-to-image network learning.

Medical image analysis involves solving important tasks such as landmark detection, anatomy detection, anatomy segmentation, lesion detection, segmentation and characterization, cross-modality image registration, image denoising, cross-domain image synthesis, etc. Computer-based automation of these medical image analysis tasks brings significant benefits to medical imaging. For example, one such benefit of automating medical image analysis tasks is that it allows structured image reading and reporting for a streamlined workflow, thereby improving image reading outcomes in terms of accuracy, reproducibility, and efficiency. Other benefits of automatic medical image analysis tasks include enabling personalized scanning at a reduced radiation dose, saving examination time and cost, and increasing consistency and reproducibility of the examination.

Currently the technical approaches for various medical image analysis tasks are task-dependent. In other words, for each task among landmark detection, anatomy detection, anatomy segmentation, lesion detection, segmentation and characterization, cross modality image registration, image denoising, cross-domain image synthesis, etc., there are a multitude of technical approaches crafted for such a task. Consequently, the approaches for solving the same task are very diverse in nature. There is no systematic, universal approach to address all of these medical image analysis tasks.

BRIEF SUMMARY OF THE INVENTION

The present invention provides a method and system for automatically performing a medical image analysis task on an input image using deep image-to-image network learning. Embodiments of the present invention utilize a deep image-to-image network (DI2IN) learning framework to unify many different medical image analysis tasks. Embodiments of the present invention formulate various medical image analysis tasks as an image-to-image mapping problem, in which a trained DI2IN is used to map an input medical image or cohort of input medical images to an output image that provides a result of a particular medical image analysis task.

In one embodiment of the present invention, an input medical image of a patient is received. An output image that provides a result of a target medical image analysis task on the input medical image is automatically generated using a trained deep image-to-image network (DI2IN), The trained DI2IN uses a conditional random field (CRF) energy function to estimate the output image based on the input medical image and uses a trained deep learning network to model unary and pairwise terms of the CRF energy function.

These and other advantages of the invention will be apparent to those of ordinary skill in the art by reference to the following detailed description and the accompanying drawings.

DETAILED DESCRIPTION

The present invention relates to a method and system for automatically performing medical image analysis tasks using deep image-to-image network (DI2IN) learning. Embodiments of the present invention are described herein to give a visual understanding of the medical image deep image-to-image network (DI2IN) learning method and the medical image analysis tasks. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention utilize a deep image-to-image network (DI2IN) learning framework to unify many different medical image analysis tasks. Embodiments of the present invention can be used to automatically implement various medical image analysis tasks, including landmark detection, anatomy detection, anatomy segmentation, lesion detection, segmentation and characterization, cross-modality image registration, image denoising, cross-domain image synthesis, and quantitative parameter mapping. Embodiments of the present invention formulate various medical image analysis tasks as an image-to-image mapping problem, in which a DI2IN is trained to learn a mapping from a particular type of input medical image or images to an output image that provides a result of a particular medical image analysis task. Embodiments of the present invention can be used to automatically perform any medical image analysis task for which the result of performing the medical image analysis task can be defined as an output image or images.

Figure 1:
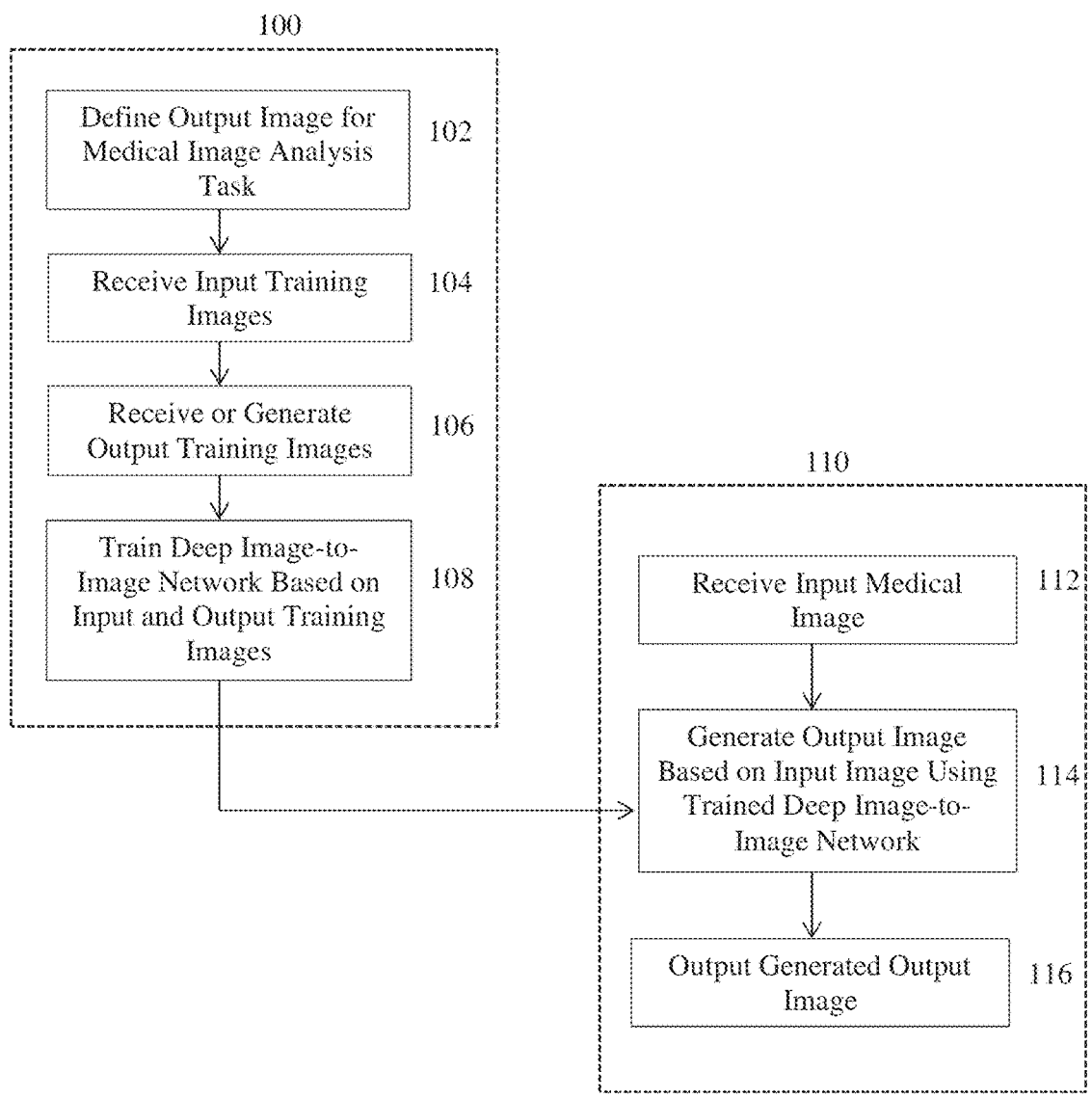
FIG. 1 illustrates a method for automatically performing a medical image analysis task using deep image-to-image network (DI2IN) learning according to an embodiment of the present invention.

FIG. 1 illustrates a method for automatically performing a medical image analysis task using deep image-to-image network (DI2IN) learning according to an embodiment of the present invention. The method of FIG. 1 includes a training stage 100 and a testing stage 110. The training stage 100, which includes steps 102-108, is performed off-line to train a DI2IN for a particular medical image analysis task. The testing stage 110, which includes steps 112-116, performs the medical image analysis task on a newly input medical image using the trained DI2IN resulting from the training stage 100. Once the DI2IN for a particular medical image analysis task is trained in the training stage 100, the testing stage 110 can be repeated for each newly received input medical image(s) to perform the medical image analysis task on each newly received input medical image(s) using the trained DI2IN.

At step 102, an output image is defined for the medical image analysis task. The DI2IN learning framework described herein utilizes an image-to-image framework in which an input medical image or multiple input medical images is/are mapped to an output image that provides the result of a particular medical image analysis task. In the DI2IN learning framework, the input is an image I or a set of images $I_1, I_2, \ldots, I_N$ and the output will be an image J or a set of images $J_1, J_2, \ldots, J_M$. An image I includes a set of pixels (for a 2D image) or voxels (for a 3D image) that form a rectangular lattice f={x} (x is a 2D vector for a 2D image and a 3D vector for a 3D image) and defines a mapping function from the lattice to a desired set, i.e., $\{I(x)\in R; x\in\Omega\}$ for a gray-value image or $\{I(x)\in R^3; x\in\Omega\}$ for a color image. If a set of images are used as the input, then they share the same lattice $\Omega$; that is, they have the same size. For the output image J, its size is often the same as that of the input image I, though different lattice sizes can be handled too as long as there is a defined correspondence between the lattice of the input image and the lattice of the output image. As used herein, unless otherwise specified, a set of images $I_1, I_2, \ldots, I_N$ will be treated as one image with multiple channels, that is $\{I(x)\in R^N; x\in\Omega\}$ for N gray images or $\{I(x)\in R^{3N}; x\in\Omega\}$ for N color images.

The DI2IN image-to-image framework can be used to formulate many different medical image analysis problems. In order to use the DI2IN framework to perform a particular medical image analysis task, an output image must be defined for the particular medical image analysis task. The solutions/results for many image analysis tasks are often not images. For example, anatomical landmark detection tasks typically provide coordinates of a landmark location in the input image and anatomy detection tasks typically provide a pose (e.g., position, orientation, and scale) of a bounding box surrounding an anatomical object of interest in the input image. According to an embodiment of the present invention, an output image is defined for a particular medical image analysis task that provides the result of that medical image analysis task in the form of an image. In one possible implementation, the output image for a target medical image analysis task can be automatically defined, for example by selecting a stored predetermined output image format corresponding to the target medical image analysis task. In another possible implementation, user input can be received corresponding to an output image format defined by a user for a target medical image analysis task. Examples of output image definitions for various medical image analysis tasks are described below.

In an exemplary embodiment, the method of FIG. 1 can be used to perform landmark detection in an input medical image. Given an input medical image I, the task is to provide the exact location(s) of a single landmark or multiple landmarks of interest $\{x_l, l=1, 2, \ldots\}$. In one implementation, the output image J can be defined as:

$$J(x)=\Sigma_l\Sigma_i l^*\delta(x-x_l), \quad (1)$$

where $\delta$ is a delta function. This results in a mask image in which pixel locations of the landmark l have a value of l, and all other pixel locations have a value of zero. In an alternative implementation, the output image for a landmark detection task can be defined as an image with a Gaussian-like circle (for 2D image) or ball (for 3D image) surrounding each landmark. Such an output image can be defined as:

$$J(x)=\Sigma_l\Sigma_i l^*\delta(|x-x_l|;\sigma), \quad (2)$$

where g(t) is a Gaussian function with support $\sigma$ and $|x-x_l|$ measures the distance from the pixel x to the $l^{th}$ landmark.

In an exemplary embodiment, the method of FIG. 1 can be used to perform anatomy detection in an input medical image. Given an input image I, the task is to find the exact bounding box of an anatomy of interest (e.g., organ, bone structure, or other anatomical object of interest). The bounding box $B(\theta)$ can be parameterized by $\theta$. For example, for an axis-aligned box, $\theta=[x_c, s]$, where $x_c$ is the center of the box and s is the size of the box. For a non-axis-aligned box, $\theta$ can include position, orientation, and scale parameters. The output image J can be defined as:

$$J(x)=1 \text{ if } x\in B(\theta); \text{ otherwise } 0. \quad (3)$$

This results in a binary mask with pixels (or voxels) equal to 1 within the bounding box and equal 0 at all other pixel locations. Similarly, this definition can be extended to cope with multiple instances of a single anatomy and/or multiple detected anatomies.

In an exemplary embodiment, the method of FIG. 1 can be used to perform anatomy segmentation in an input medical image. Given an input image I, the task is to find the exact boundary of an anatomy or anatomies of interest. In one implementation, the output image J can be a multi-label mask function, defined as:

$$J(x)=l \text{ if } x\in \text{Anatomy}_l; \text{ otherwise } 0. \quad (4)$$

In an alternative implementation, the output image J can be defined as an image having a Gaussian-like band surrounding the boundary of each segmented anatomy of interest. Such an output image can be defined as:

$$J(x)=g(d(x,\text{Anatomy}_l \text{ boundary})), \quad (5)$$

where d(x, Anatomy$_l$ boundary) is the distance from the pixel x to the boundary of the $l^{th}$ segmented anatomy. In other possible implementations, representations such as a signed distance function or even level sets may also be used to define the output image for the anatomy segmentation task.

In an exemplary embodiment, the method of FIG. 1 can be used to perform lesion detection, segmentation, and characterization in an input medical image. In lesion detection and segmentation, given an input image I, the tasks are to detect and segment one or multiple lesions. The output image J for lesion detection and segmentation can be defined as described above for the anatomy detection and segmentation tasks. To handle lesion characterization, which aims to distinguish if a lesion is benign or malignant, if a liver lesion is hyperdense or hypodense, etc., the output image J can be defined by further assigning new labels in the multi-label mask function (Eq. (4)) or the Gaussian band (Eq. (5)) so that fine-grained characterization labels can be captured in the output image.

In an exemplary embodiment, the method of FIG. 1 can be used to perform image denoising of an input medical image. Given an input image I, the image denoising task generates an output image J in which the noise is reduced.

In an exemplary embodiment, the method of FIG. 1 can be used to perform cross-domain image synthesis. Given an input image/acquired from a source domain, the cross-domain image synthesis task generates an output image J as if it was acquired from a target domain. Examples of source/target domains for cross-domain image synthesis includes, but is not limited to, computed tomography (CT)/magnetic resonance (MR), T1-weighted MR (MRT1)/T-2 weighted MR (MRT2), CT/DynaCT, etc.

In an exemplary embodiment, the method of FIG. 1 can be used to perform cross-modality image registration. Given a pair of input images $\{I_1, I_2\}$, the image registration task finds a deformation field $d(x)$ such that $I_1(x)$ and $I_2(x-d(x))$ are in correspondence. In an advantageous implementation, the output image $J(x)$ is exactly the deformation field, $J(x)=d(x)$.

In an exemplary embodiment, the method of FIG. 1 can be used to perform quantitative parametric mapping. Given a set of input images $\{I_1, \ldots, I_n\}$ and a pointwise generative model $\{I_1, \ldots, I_n\}(X)=F(J_1, \ldots, J_m)(X)$, a parametric mapping task aims to recover the quantitative parameters that generated the input images. Examples of quantitative mapping tasks include MR fingerprinting and material decomposition from spectral CT.

It is to be understood, that for any medical image analysis task, as long as an output image can be defined for that medical image analysis task that provides the results of that medical image analysis task, the medical image analysis task can be regarded as a DI2IN learning problem and performed using the method of FIG. 1.

Returning to FIG. 1, at step 104, input training images are received. The input training images are medical images acquired using any type of medical imaging modality, such as computed tomography (CT), magnetic resonance (MR), DynaCT, ultrasound, x-ray, positron emission tomography (PET), etc. The input training images correspond to a particular medical image analysis task for which the DI2IN is to be trained. Depending on the particular medical image analysis task for which the DI2IN is to be trained, each input training image for training the DI2IN can be an individual medical image or a set of multiple medical images. The input training images can be received by loading a number of previously stored medical images from a database of medical images.

At step 106, output training images corresponding to the input training images are received or generated. The DI2IN trained for the particular medical image analysis task is trained based on paired input and output training samples. Accordingly for each input training image (or set of input training images), a corresponding output training image is received or generated. The output images for various medical image analysis tasks are defined as described above in step 102. In some embodiments, the output images corresponding to the input training images may be existing images that are stored in a database. In this case, the output training images are received by loading the previously stored output image corresponding to each input training image. In this case, the output training images may be received at the same time as the input training images are received. For example, for the image denoising task, a previously stored reduced noise medical image corresponding to each input training image may be received. For the cross-domain image synthesis task, each input training image is a source domain medical image and a previously acquired target domain medical image corresponding to each source domain medical image may be received. For the cross-modality image registration task, for each input training image pair, a previously stored deformation field defining a registration between the input training image pair may be received. For the quantitative parametric mapping task, for each set of input training images, a previously acquired set of quantitative parameters can be received. For landmark detection, anatomy detection, anatomy segmentation, and lesion detection, segmentation and characterization tasks, if previously stored output images (as defined above) exist for the input training images, the previously stored output images can be received.

In other embodiments, output training images can be generated automatically or semi-automatically from the received input training images. For example, for landmark detection, anatomy detection, anatomy segmentation, and lesion detection, segmentation and characterization tasks, the received input training images may include annotated detection/segmentation/characterization results or manual annotations of landmark 1 anatomy/lesion locations, boundaries, and/or characterizations may be received from a user via a user input device (e.g., mouse, touchscreen, etc.). The output training images can then be generated by automatically generating a mask images or Gaussian-like circle/band image as described above for each input training image based on the annotations in each input training image. It is also possible, that the locations, boundaries, and/or characterizations in the training input images be determined using an existing automatic or semi-automatic detection/segmentation/characterization algorithm and then used as basis for automatically generating the corresponding output training images. For the image denoising task, if no reduced noise images corresponding to the input training images are already stored, an existing filtering or denoising algorithm can be applied to the input training images to generate the output training images. For the cross-modality image registration task, the output training images can be generated by registering each input training image pair using an existing image registration algorithm to generate a deformation field for each input training image pair. For the quantitative parametric mapping task, the output training image can be generated by applying an existing parametric mapping algorithm to each set of input training images to calculate a corresponding set of quantitative parameters for each set of input training images.

At step 108, a deep image-to-image network (DI2IN) is trained for a particular medical image analysis task based on the input and output training images. According to an advantageous embodiment of the present invention, a mathematical model for the DI2IN is based on a Conditional Random Field (CRF), in which an energy function E is defined as:

$$E(J(x)|I(x);\theta)=\Sigma_{x\in\Omega}U(J(x)|I(x);\theta)+\Sigma_{x,y\in\Theta}V(J(x),J(y)|I(x),J(y);\theta), \quad (6)$$

where $U(J(x)|I(x))$ is the unary term, $V(J(x),J(y)|I(x), I(y))$ is the pairwise term, $\Theta$ is the set of neighboring pixels, and $\Theta$ is the modeling parameter. The likelihood is now given by:

$$P(J(x)|I(x);\theta)=\exp(-E(J(x)|I(x);\theta))/Z(I(x);\theta), \quad (7)$$

where $Z(I(x); \theta)$ is a normalizing partition function.

During training, assuming the availability of paired training datasets $\{(I_n(x), J_n(x)); n=1, 2, \ldots \}$, following the maximum likelihood principle, the goal of the training is maximize the likelihood P with respect to the modeling parameter $\theta$:

$$\min_\theta \Sigma_n [E(J_n(x)|I_n(x);\theta)+\log Z(I(x);\theta)]. \quad (8)$$

In some possible implementations, a regularization term may also be included in Equation (8) to capture a prior belief about the parameter θ. Choices of the regularization include L2 norm, sparsity, etc. The training learns the modeling parameter θ that maximizes the likelihood P. During the testing (or estimation/inference) stage (110 of FIG. 1), given an newly received input image I(x), an output image is generated that maximizes the likelihood P(J(x)|I(x); θ) with the parameter θ fixed as the parameter learned during training.

Figure 2:
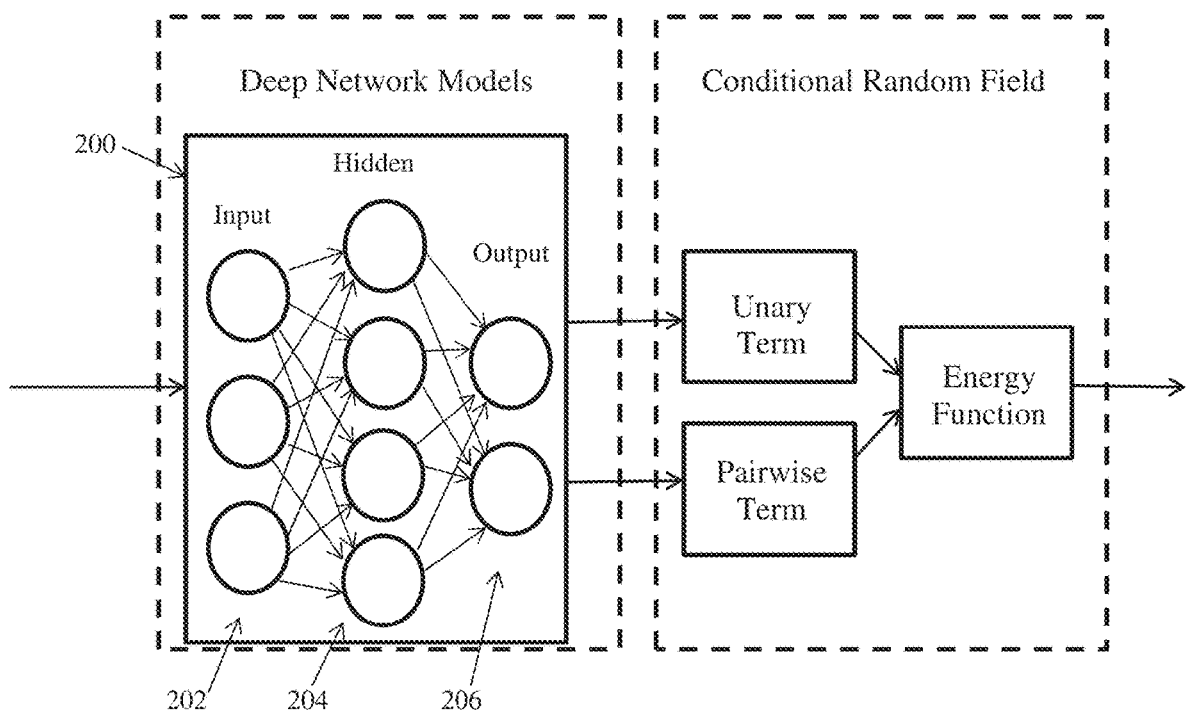
FIG. 2 illustrates training a DI2IN using a deep learning model in a Conditional Random Field (CRF) framework according to an embodiment of the present invention.

The modeling choices for the unary and pairwise terms of the CRF energy function largely determines the effectiveness of the solution. According to an advantageous embodiment of the present invention, deep learning is used to model the unary and pairwise terms of the CRF energy function. FIG. 2 illustrates training a DI2IN using a deep learning model in a Conditional Random Field (CRF) framework according to an embodiment of the present invention. As shown in FIG. 2, a deep network 200 is learned to model the unary and pairwise terms of the CRF energy function. A deep network 200 includes an input layer 202, multiple hidden layers 204, and an output layer 206. For example, the deep network 200 may be a fully connected deep neural network or a convolutional neural network (CNN). The connections between two consecutive layers k and k−1 in the deep neural network 200 are through a set of weights or a weight matrix $W_{k,k-1}$. The input layer 202 of the deep network 200 corresponds to image data of the input image (or input images). The output layer 206 of the deep network has two nodes, one which outputs a value for the unary term of the CRF energy function, and one which outputs the pairwise term of the CRF energy function. The outputs from the nodes of the output layer 206 of the deep network 200 are then directly connected into the CRF energy function. The parameters for the deep network 200 are θ={$W_{k,k-1}$, k=2, 3, . . . }. Accordingly, in order to train the DI2IN, given paired input and output training images, weights for all the layers of the deep network 200 are learned which result in unary and pairwise terms of the CRF energy function which maximize the likelihood P(J(x)|I(x); θ). Alternatively, the deep network can be trained to generate the unary term of the CRF energy function and the pairwise term can be trained or defined using other methods.

In an embodiment in which the desired output image is a multi-label mask, for example in the cases of landmark detection, anatomy detection and segmentation, and lesion detection, segmentation, and characterization, a multi-class classifier can be learned via a deep network that computes the probability P(l|I(x); θ) of assigning the image pixel I(x) with label l and the unary term can be set as:

$$U(J(x)=I(x);\theta)=-\log P(P(l|I(x);\theta)). \quad (9)$$

For the pairwise term, it is advantageous to enforce label smoothness or cross-label context. If the image content at locations x and y are close, their labels should be close as well. In a possible implementation, to enforce label smoothness, the pairwise term can be set as:

$$V(J(x)=l,J(y)=m|I(x),I(y);\theta)=\delta(l-m)g(I(x),I(y)), \quad (10)$$

where g(I(x),I(y)) measures the closeness between I(x) and I(y) in terms of both spatial locations and feature values. Alternatively, to leverage cross-label context, a deep network can be trained too, in which paired class labels (l,m) are used. In other words, the deep network P(l, m|I(x), I(y), θ) is learned to classify (I(x), I(y)) into one of the paired classed (l,m). In this case, the pairwise term can be set as:

$$V(J(x)=l,J(y)=m|I(x),I(y);\theta)=-\log(l,m|I(x),I(y)). \quad (11)$$

In an embodiment in which the output image is a real-valued image, for example in the case of image synthesis, image denoising, and image registration, etc., a regression function F(I(x); θ) can be learned via a deep network that approximates the target output image J(x) and the unary term can be set as:

$$U(J(x)|I(x);\theta,\sigma) = \frac{\|J(x)-F(I(x);\theta)\|^2}{(2\sigma^2)} + \log(\sigma), \quad (12)$$

where σ is a pre-specified standard deviation value. For the pairwise term, to enforce smoothness in the spatial locations, the predicted output values, and the input values, the pairwise term can be set as:

$$V(J(x),J(y)|I(x),I(y);\theta)=\lambda_1\|J(x)-J(y)\|^2+\lambda_2\|I(x)-I(y)\|^2+\lambda_3\|x-y\|^2, \quad (13)$$

where $\lambda_1$, $\lambda_2$, and $\lambda_3$ are weighting parameters used to weight the relative importance of smoothness in the predicted output values, the input values, and the spatial locations, respectively. Alternatively, it is possible to learn a joint regression function G that predicts both values of (J(x), J(y))=G(I(x), I(y); θ) based on I(x) and I(y) and then set the pairwise term as:

$$V(J(x),J(y)|I(x),I(y);\theta) = \frac{\|[J(x),J(y)]-G(I(x),I(y);\theta)\|^2}{(2\rho^2)} + \log(\rho), \quad (14)$$

where σ is a pre-specified standard deviation value.

In another possible implementation, where the target real-valued image J is the same for all input image I, but unknown, the training can be extended through the iteration of 2 steps: first, the energy function can be optimized with a given target output image $J_t$, and second the best target output image $J_{t+1}$ can be learned given the optimized energy function. For example, this can be applied to groupwise image registration or atlas-based image registration.

During learning (training), the deep-network is trained in an end-to-end fashion such that Equation (8) is minimized by using the deep network model parameters (i.e., the weights of the deep network). This is performed by computing the gradient of the CRF energy function with respect to the deep network model parameters, which can be done by applying the well-known chain rule. As a result, the well-known Back Propagation (BP) algorithm can be used to implement stochastic gradient descent in order to learn the deep network model parameters (weights) that minimize Equation (8). In the testing stage, the deep network with the learned weights is then used to calculate the unary and pairwise terms of the CRF energy function and the output image is found that optimizes the CRF energy function (i.e., minimizes Equation (8)). To handle complexity in the CRF inference, the mean field approximation method can be utilized to derive a solution efficiently. In an advantageous implementation, to reduce overfitting in learning the deep network, a convolution network, such as a CNN, in which a reduced number of parameters is defined across two consecutive layers of the deep network. When the convolutional network is used for every pixel location, a fully convolutional network is implied.

Returning to FIG. 1, in the testing stage 110, at step 112, an input medical image is received. The input medical image can be a 2D or 3D medical image acquired using any type of medical imaging modality, such as CT, MR, DynaCT, ultrasound, PET, etc. Depending on the medical imaging task to be performed for the received input medical image, the input medical image may be a set of medical images. The input medical image may be received directly from an image acquisition device used to acquire the input medical image, such as a CT scanner, MR scanner, etc. Alternatively, the input medical image may be received by loading a previously acquired medical image from a storage or memory of a computer system or receiving a medical image that has been transmitted from a remote computer system.

At step 114, an output image that provides a result of a medical image analysis task is generated from the input image using the trained deep image-to-image network (DI2IN). As described above, the trained DI2IN includes a trained deep network that calculates a unary term and a pairwise term of the CRF energy function for a predicted output image based on the input medical image and the learned weights of the deep network. The output image is generated by estimating an output image that optimizes the CRF energy function. In particular, with the deep network parameters fixed using the learned weights, an output image is found that minimizes Equation (8) (i.e., maximizes the likelihood of the CRF energy function) for the received input image. The unary and pairwise terms calculated using the trained deep network are set based on the type of output image to be generated, as described above in connection with step 108. The type of output image generated for the target medical image task to be performed is defined at step 102 of the training stage 100 and various examples are described above. For example, a multi-label or binary mask image or a Gaussian-like circle or band image can be generated to provide the results of a landmark detection, anatomy detection or segmentation, or lesion detection, segmentation and characterization task. A denoised medical image can be generated to provide the result of an image denoising task. A synthesized target domain medical image may be generated based on an input source domain medical image to provide the result on a cross-domain image synthesis task. A deformation field may be generated to provide the result for a cross-modality image registration task between a pair of input medical images. An image map of quantitative parameters may be generated from a set of input medical images to provide the result of a parametric mapping.

At step 116, the generated output image, which provides the result of the target medical image analysis task for the input image, is output. For example, the generated output image can be output by displaying the generated output image on a display device of a computer system. The generated output image can also be output by storing the generated output image on a memory or storage of a computer system or by transmitting the generated output image to a remote computer system.

According to an advantageous embodiment of the present invention, a multiscale part-based DI2IN can be trained and used to improve efficiency, robustness, and accuracy of a medical image analysis task. In the present disclosure, a multiscale part-based DI2IN is described for anatomical object segmentation in a 3D medical image. It is to be understood that such a multiscale part-based DI2IN can be trained and applied for other medical image analysis tasks as well.

Automatic detection and segmentation of an anatomical structure (object) in medical images is often a prerequisite for subsequent tasks such as recognition, measurement, or motion tracking, and therefore has numerous applications. Various methods have been proposed for medical image segmentation. However, the robustness and accuracy of those methods still needs further improvement on challenging segmentation problems where the target object exhibits high variations in position, orientations, size, shape, appearance, etc. Recently, fully convolutional network (FCN) has been proposed to leverage a deep convolutional neural network to perform segmentation with one-shot pixel classification (i.e., no bounding box detection is required) in 2D images. The network is trained end-to-end and the segmentation procedure is relatively efficient using a graphics processing unit (GPU) card. However, in FCN, voxel classification is based on a fixed field-of-view (FoV), which may not be optimal, especially for objects exhibiting large variations in size. With the rapid progress of medical imaging technology in the past decade, most medical images are 3D in nature (e.g., CT, MR, or ultrasound). Extending FCN to 3D bring several practical issues, including increased computational cost and memory footprint.

In an advantageous embodiment of the present invention, a multiscale part-based DI2IN is used for anatomical object segmentation of 3D medical images in order to address the above described challenges. A scale space representation (i.e., an image pyramid) of the input image data at multiple image resolutions can be built. For example, reduced resolution images of an input image at resolutions of 16 mm, 8 mm, 4 mm, and 2 mm can be generated. Such an image pyramid can be used in various ways during training and testing. One possible approach is to extract image patches at multiple resolutions. All of these image patches can then be used to simultaneously perform classification. A patch with a fixed size actually has a different field of view (FoV) at different resolutions. For example, a patch with 15×15×15 voxels has an FoV of 240×240×240 mm$^3$ at the 16 mm resolution. Joint training with patches from multiple resolutions can increase robustness of the trained classifier under variation of the object size. As long as the object size matches one of the FoVs, it can be potentially segmented correctly. However, such an approach cannot accelerate the segmentation speed or reduce the memory footprint.

Alternatively, in an advantageous embodiment of the present invention, a sequence of DI2IN classifiers are trained on images with different resolutions. This results in a multiscale DI2IN including a respective DI2IN classifier for each of a plurality of resolutions, in which the segmentation result at a lower resolution is used to constrain the voxel classification at a higher resolution. This can significantly increase the segmentation speed and reduce the memory footprint required for the segmentation. In addition, a part-based DI2IN can be utilized for segmentation of an input image, in which the input image data is split into multiple parts and a separate trained DI2IN classifier is used to perform the segmentation in each of the parts of the input image. This can improve efficiency and accuracy of the segmentation. In various possible implementations, either multiscale DI2IN or part-based DI2IN may be independently implemented or may be combined into a multiscale part-based DI2IN.

Figure 3:
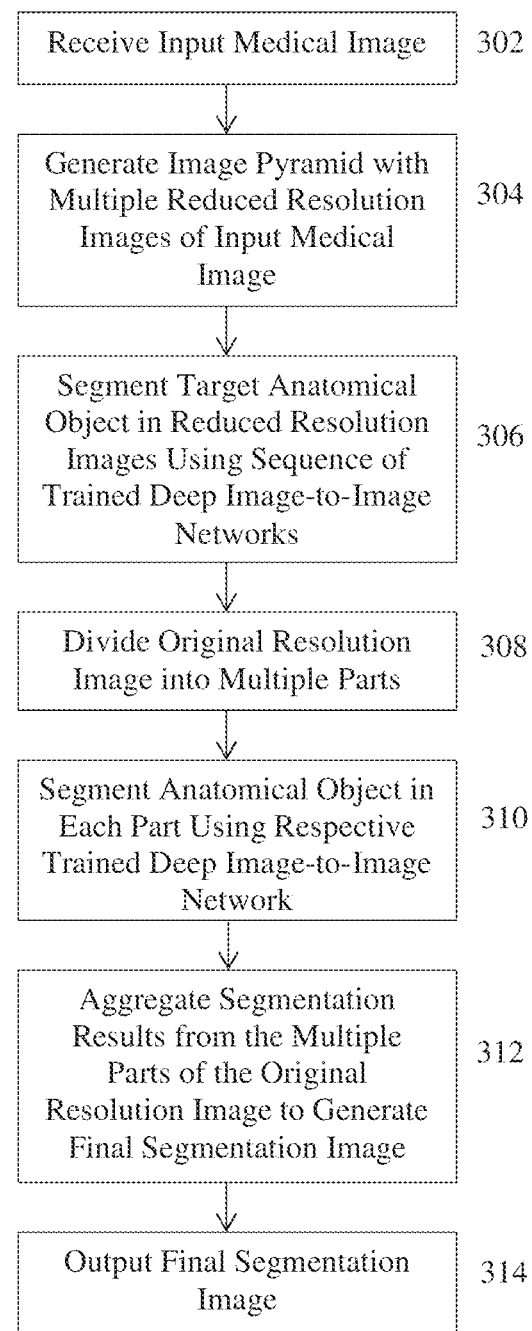
FIG. 3 illustrates a method of anatomical object segmentation in a medical image using a multiscale part-based DI2IN according to an embodiment of the present invention.

FIG. 3 illustrates a method of anatomical object segmentation in a medical image using a multiscale part-based DI2IN according to an embodiment of the present invention. At step 302, an input medical image is received. The input medical image can be a medical image acquired using any type of medical imaging modality, such as CT, MR, ultrasound, PET, DynaCT, x-ray, etc. In an advantageous implementation, the input medical image is a 3D medical image, but the present invention is not limited thereto. The input medical image may be received directly from an image acquisitions device, such as a CT scanner, MR scanner, etc. Alternatively, the input medical image may be received by loading a previously acquired medical image from a storage or memory of a computer system or receiving a medical image that has been transmitted from a remote computer system.

At step 304, an image pyramid with multiple reduced resolution images of the input medical image is generated. The image pyramid is a scale space representation of the input medical image at multiple resolutions. For example, reduced resolution images of the input medical image at resolutions of 16 mm, 8 mm, 4 mm, and 2 mm can be generated. The number and resolutions of the reduced resolution images that are generated correspond to the structure of a trained multiscale part-based DI2IN (see step 306), which can be set in training of the multiscale part-based DI2IN. The image pyramid of the input medical image can be generated using well known techniques for generated reduced resolution images of an input image.

At step 306, a target anatomical object is segmented in each of the reduced resolution images using a sequence of trained DI2IN classifiers. The multiscale part-based DI2IN includes a respective trained DI2IN for each of a plurality of resolution levels. Each respective DI2IN is trained as described above using the method of FIG. 1. Accordingly, each trained DI2IN generates an output image that provides segmentation results for the target anatomical object at the respective resolution level. The segmentation result from the respective trained DI2IN at each reduced resolution level is used to constrain the voxel classification (segmentation) at the subsequent higher resolution level. For example, the higher level DI2IN classification can be constrained to a segmentation mask generated at a lower resolution. That is, the respective trained DI2IN at each reduced resolution level can generate a segmentation mask, and the segmentation mask at each reduced resolution level can be used to define a region of interest (ROI) in the image at the next higher resolution. The ROI is then cropped from the higher resolution image and used as the input image to the next trained DI2IN in the classifier. The ROI in a higher resolution image can correspond to voxels in the lower resolution segmentation mask having non-zero values. In a possible embodiment, the coarse segmentation mask from the lower resolution image may be expanded to compensate for segmentation error due to partial volume effects or imaging noise prior to defining the ROI in the higher resolution image. In many cases, the segmentation result at low resolutions will only occupy a small portion of the image data, such as 10% or even as low as 1%. Therefore, the classification (segmentation) result at low resolutions can be used to eliminate a large portion of the data for consideration at higher resolutions, which significantly increases segmentation speed.

In Convolutional Neural Networks (CNN), convolution of filters is performed to extract image features. The filter responses are cached as input to the next CNN layer. If the network is deep or many filters (e.g., hundreds of filters) are used at a certain layer, the memory footprint is high. The maximum amount of memory of a single GPU currently available on market is 12 GB, e.g., the widely used NVIDIA GTX Titan X GPU. (NVIDIA Tesla K80 has 24 GB memory, but it combines two K40 GPUs and there is overhead in transferring data between GPUs.) A typical full-body CT scan contains about 512×512×1000 voxels. Represented with a "float" precision (4 bytes), such a CT scan consumes about 1 GB memory. With 12 GB memory, we can only have up to 12 filters at the original high resolution. In reality, the possible number of filters is even smaller since other CNN layers also consume memory. By using the segmentation mask at a lower resolution on the image pyramid to constrain the input image data at each subsequent higher resolution, a large portion of the image can be discarded completely in the following processing at the subsequent higher resolution. Instead of taking the whole volume as input to the next (higher resolution) layer, the volume can be cropped based on the ROI determined by the coarse segmentation at a lower resolution. In this way, the memory footprint is significantly reduced during training and testing of the DI2IN.

Figure 4:
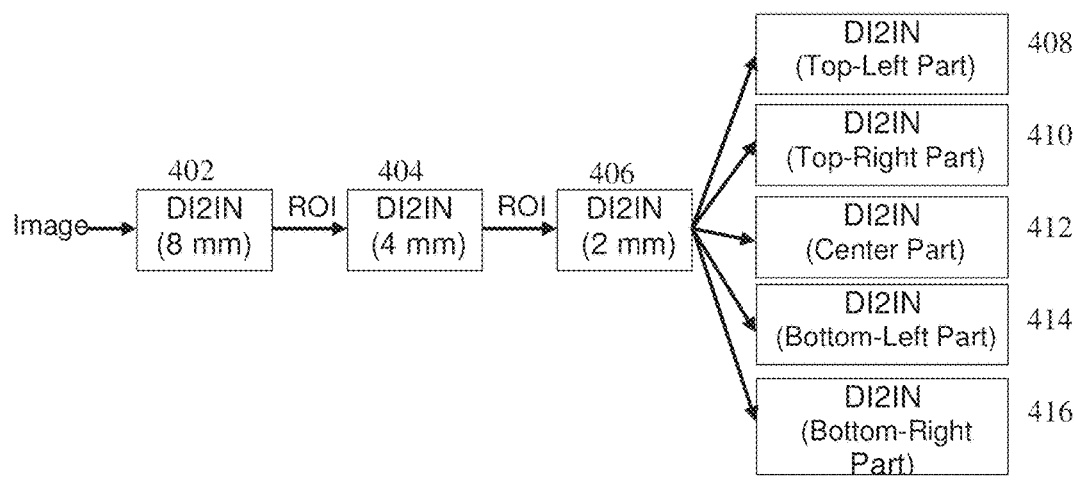
FIG. 4 illustrates an exemplary multiscale part-based DI2IN for anatomical object segmentation in a medical image according to an embodiment of the present invention.

FIG. 4 illustrates an exemplary multiscale part-based DI2IN for anatomical object segmentation in a medical image according to an embodiment of the present invention. As shown in FIG. 4, the multiscale part-based DI2IN includes respective trained DI2INs 402, 404, and 406 for reduced resolution levels of 8 mm, 4 mm, and 2 mm, respectively. Accordingly, reduced resolution images of the input medical image are generated with resolutions of 8 mm, 4 mm, and 2 mm. DI2IN 402 inputs the 8 mm reduced resolution image and generates a segmentation mask providing a segmentation result in the 8 mm reduced resolution image. The segmentation mask for the 8 mm reduced resolution image defines a ROI which is cropped from the 4 mm reduced resolution image and input to DI2IN 404. DI2IN 404 generates a segmentation mask providing a segmentation result in the ROI of the 4 mm reduced resolution image, and the 4 mm resolution segmentation mask defines a ROI which is cropped from the 2 mm reduced resolution image and input to DI2IN 406. DI2IN 406 generates a segmentation mask providing a segmentation result in the ROI of the 2 mm reduced resolution image. The 2 mm resolution segmentation mask defines an ROI in the original resolution image, which is then classified using a part-based DI2IN.

In addition to reducing the computation time and memory footprint, multiscale DI2IN can also help to compensate variations in object pose and size, thereby increasing the segmentation accuracy. At a low resolution, even though DI2IN may not be able to provide an accurate segmentation of the target object, it will usually provide accurate information of the object location, orientation, and size. With a cropped volume as input to the next level DI2IN, variation in the object center can be removed by putting the object at the center of the cropped volume. In addition, the cropped volume can be further normalized with respect to estimated orientation and size. For example, the ROI can be aligned to the estimated orientation (a tilted ROI) and the ROI size can be set to be proportional to the estimated object size. Once an ROI is determined, other normalization is also possible. For example, non-linear voxel intensity transformation can be performed to make the ROI intensity histogram match statistics calculated from the training set. A classification probability map at a lower resolution can also be exploited as an additional input channel to the next DI2IN. This may further increase the classification accuracy.

Returning to FIG. 3, at step 308, the original resolution image is divided into multiple parts. At step 310, the anatomical object is segmented in each part using a respective trained DI2IN classifier. The segmentation of the original resolution input medical image can be constrained based on the segmentation mask generated from the highest resolution reduced resolution image (e.g., 2 mm in FIG. 4). In particular, the segmentation mask generated from highest resolution reduced resolution image can define an ROI in the original resolution image. The ROI can be cropped from the original resolution input medical image and used as the input image for segmentation at the original resolution. However, if the target object is large, such as the lungs or liver, the cropped volume can still consume a large amount of memory at the highest resolution. Even though DI2IN segments a whole input image with a single forward evaluation of the network, the FoV to perform classification for each voxel is much smaller and fixed. Therefore, the classification of a voxel on a top portion of the object does not use information from the bottom portion of the object at all (if the object height is larger than the FoV. Thus, according to an advantageous embodiment of the present invention, a part-based approach can be used to further reduce the memory footprint of the multiscale DI2IN.

In an advantageous implementation, the original resolution input image resulting from cropping the ROI from the original resolution input medical image can be split into multiple overlapping regions, each referred to as a "part" of the image. According to an advantageous implementation, neighboring regions (parts) should have an overlap at least half of the FoV of the trained deep network in order to generate exactly the same output as performing classification on the whole input image. For example, if the neural network takes a patch of 15×15×15 voxels as input for classification, the overlap between neighboring regions (parts) should be 8 voxels or more. A respective trained DI2IN is trained for segmentation of the target anatomical object in each of the image parts and segmentation of the anatomical object is independently performed in each of the parts of the input original resolution image using the respective trained DI2IN classifier. Each region (part) needs to have a size at least as large as the FoV for voxel classification. If the size of each region (part) is set to the same size as the classification FoV, each voxel will have its own region. This is equivalent to patch-based classification, which is not efficient. Therefore, in an advantageous implementation, the image can be split into a small number of regions (e.g., 5) having a size larger than the classification FoV subject to the constraint of GPU memory. The image characteristics of each part and its surrounding tissue may be quite different. Therefore, a divide-and-conquer strategy can be exploited to train a respective DI2IN for each part. The can make the learning problem easier, resulting in increased segmentation accuracy. The respective DI2IN for each part can be trained as described above using the method of FIG. 1.

Figure 5:
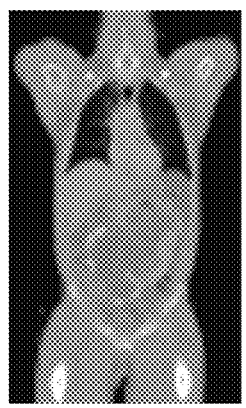
FIG. 5 illustrates exemplary liver segmentation using the multi-scale part-based DI2IN of FIG. 4.
Figure 5:
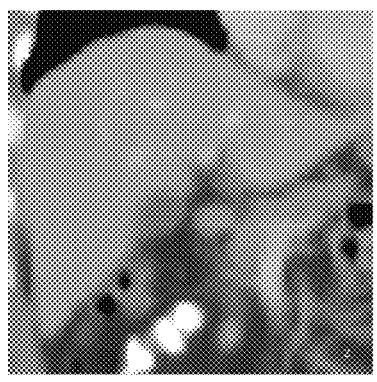
Figure 5:
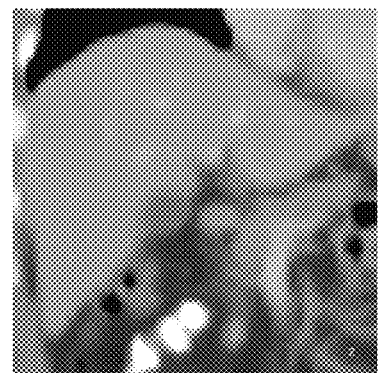
Figure 5:
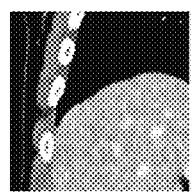
Figure 5:
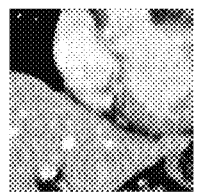
Figure 5:
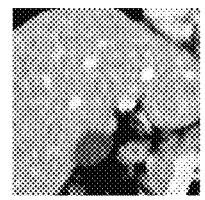
Figure 5:
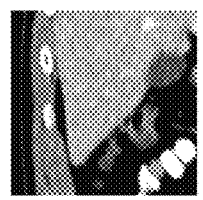
Figure 5:

As shown in FIG. 4, the multiscale part-based DI2IN of FIG. 4 includes DI2INs 408, 410, 412, 414, and 416, each of which performs segmentation of a respective part of the input medical image at the original resolution. The 2 mm segmentation mask generated by DI2IN 406 defines an ROI that is cropped from the original resolution input medical image, resulting in a cropped original resolution image. The cropped original resolution image is divided into the following five overlapping parts: a top-left part, a top-right part, a center part, a bottom-left part, and a bottom-right part. The size of these parts can be set during training. Each of the parts of the cropped resolution image is an input image that is input to a respective trained DI2IN. DI2INs 408, 410, 412, 414, and 416 segment that top-left part, top-right part, center part, bottom-left part, and bottom-right part, respectively. Each of the part-based original resolution DI2INs 408, 410, 412, 414, and 416 inputs the respective part of the cropped resolution image and outputs a segmentation mask that provides segmentation results for the prospective part. FIG. 5 illustrates exemplary liver segmentation using the multiscale part-based DI2IN of FIG. 4. As shown in FIG. 5, image 502 shows a full torso CT scan at 8 mm resolution. Image 504 shows a cropped liver ROI at the 4 mm resolution using the coarse segmentation at the 8 mm resolution. Image 506 shows a cropped ROI at the 2 mm resolution. Images 508, 510, 512, 514, and 516 show cropped top-left, top-right, center, bottom-left, and bottom-right parts, respectively, of the ROI at the original resolution.

In the embodiment described above in which multiscale and part-based DI2IN are combined, the cropped original resolution image generated from the ROI defined based on the segmentation mask at the highest reduced resolution is divided into multiple parts and each part is independently segmented using a respective trained DI2IN. It is to be understood, that part-based DI2IN can also be applied without multiscale DI2IN, in which case the whole input medical image is divided into a plurality of parts and a respective trained DI2IN used to perform segmentation in each part.

Returning to FIG. 3, at step 312, the segmentation results from the multiple parts of the original resolution image are aggregated to generate a final segmentation image. A respective output image, such as a segmentation mask, can be the respective DI2IN trained for each part, and the output images are combined to generate a final output image (e.g., segmentation mask) that provides the final segmentation result. Due to the overlap between neighboring regions (parts), voxels in the overlapping areas have multiple outputs from different DI2INs. Depending on the medical image analysis task, various aggregation methods can be used to combine the overlapping areas. If the output is a real value image, the values of the voxels in overlapping areas of output images can be averaged, either using a weighted or unweighted average. For segmentation (or detection or characterization), the output for each voxel is a class label that is a discreet value from a limited set. In this case, majority voting (weighted or unweighted) can be used to determine the voxel values in the final output image for voxels in overlapping areas of the output images for the multiple parts.

At step 314, the final segmentation image is output. For example, the final segmentation image can be output by displaying the final segmentation image on a display device of a computer system. The final segmentation image can also be output by storing the final segmentation image on a storage or memory of a computer system or by transmitting the final segmentation image to a remote computer system. In addition to the final segmentation image, the output images providing the segmentation results at the various resolutions and/or for the various parts can also be output. For example, one or more of the output images from the multiscale and multi-part DI2INs can be displayed on the display device.

As described above in the method of FIG. 3, multiscale and part-based DI2IN are used together. It is to be understood that either multiscale DI2IN or part-based DI2IN may also be used independent of one another. The method of FIG. 3 uses multiscale part-based DI2IN to automatically perform anatomical object segmentation in a 3D medical image. It is to be understood that this multiscale and/or part-based DI2IN framework can be similarly applied to other medical image analysis tasks as well. The multiscale and part-based DI2IN framework described for the anatomical object segmentation task can be applied straightforwardly to medical image analysis tasks that generate a mask image, such as landmark detection, anatomical object detection, and lesion detection, segmentation and characterization. The part-based DI2IN can also be applied straightforwardly to other medical image analysis tasks, such as image denoising, cross-domain image synthesis, cross-modality image registration, and quantitative parametric mapping. In an exemplary implementation, in order to apply multiscale DI2IN to medical image analysis tasks such as image denoising, cross-domain image synthesis, cross-modality image registration, and quantitative parametric mapping, output images can be generated at various resolution levels and the estimated output images at various resolution levels can be aggregated, for example by averaging or calculating a weight average of the estimated output images at the various resolution levels.

Figure 6:
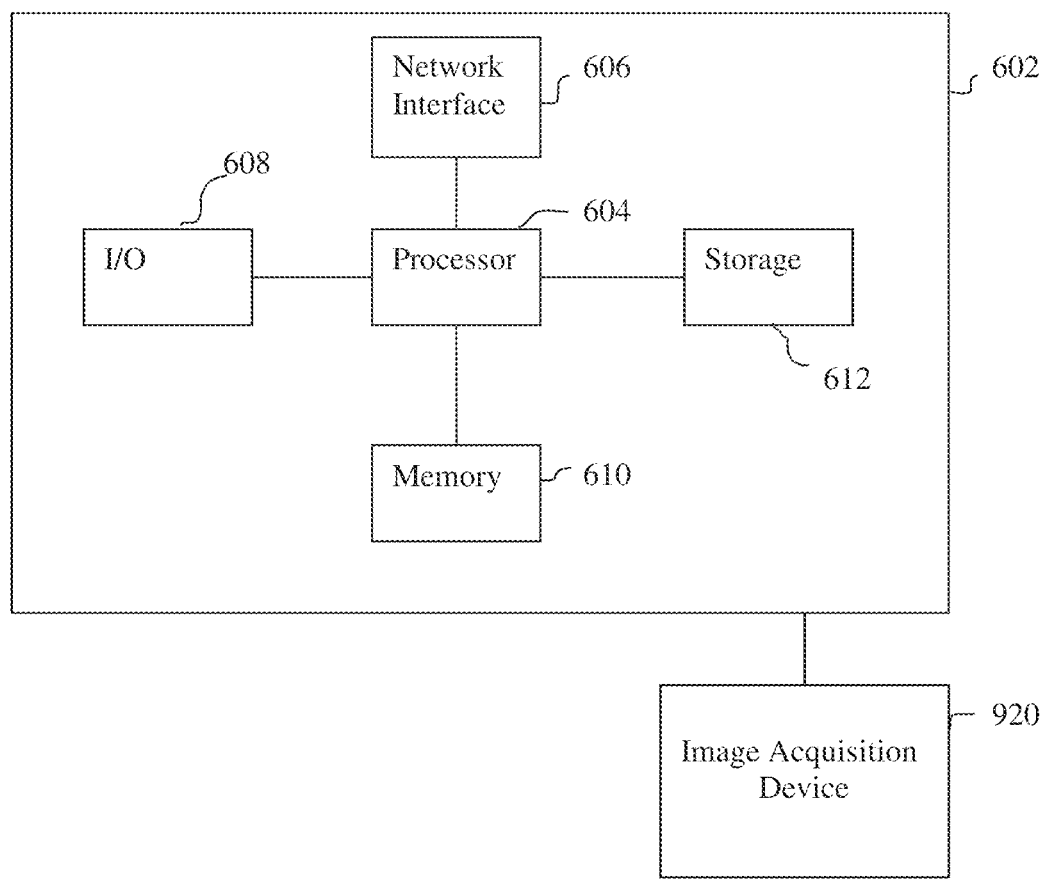
FIG. 6 is a high-level block diagram of a computer capable of implementing the present invention.

The above-described methods for training a DI2IN, automatically performing a medical image analysis task using a DI2IN, and anatomical object segmentation in a medical image using a multiscale part-based DI2IN may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 3 may be defined by the computer program instructions stored in the memory 610 and/or storage 612 and controlled by the processor 604 executing the computer program instructions. An image acquisition device 620, such as an MR scanning device or a CT scanning device, can be connected to the computer 602 to input image data to the computer 602. It is possible to implement the image acquisition device 620 and the computer 602 as one device. It is also possible that the image acquisition device 620 and the computer 602 communicate wirelessly through a network. In a possible embodiment, the computer 602 can be located remotely with respect to the image acquisition device 620 and the method steps described herein can be performed as part of a server or cloud based service. In this case, the method steps may be performed on a single computer or distributed between multiple networked computers. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automatically performing a medical image analysis task on a medical image of a patient, comprising:
   receiving an input medical image of a patient; and
   automatically generating an output image that provides a result of a target medical image analysis task on the input medical image using a trained part-based deep image-to-image network (DI2IN) comprising a plurality of trained DI2INs corresponding to a plurality of parts of the input medical image by:
   dividing the input medical image into the plurality of parts,
   automatically generating, for each of the plurality of parts of the input medical image, a respective output image that provides a result of the target medical image analysis task on that part of the input medical image using the corresponding one of the plurality of trained DI2INs, and
   aggregating the respective output images that provide the results of the target medical image analysis task on each of the plurality of parts of the input medical image to generate a final output image that provides the result of the target medical image analysis task on the input medical image.

2. The method of claim 1, wherein each of the trained DI2INs uses a conditional random field (CRF) energy function to estimate the respective output image based on the corresponding one of the plurality of parts of the input medical image and uses a respective trained deep learning network to model unary and pairwise terms of the CRF energy function.

3. The method of claim 1, wherein the target medical image analysis task is detection of one or more anatomical landmarks in the input medical image, and the final output image is one of a mask image in which only locations of the one or more anatomical landmarks have non-zero pixel or voxel values or an image with a Gaussian-like circle defined surrounding locations of the one or more anatomical landmarks.

4. The method of claim 1, wherein the target medical image analysis task is detection of an anatomy of interest in the input medical image, and the final output image is a mask image in which only pixels or voxels located within a bounding box of the anatomy of interest have non-zero values.

5. The method of claim 1, wherein the target medical image analysis task is segmentation of one or more anatomies of interest in the input medical image, and the final output image is one of a mask image in which only pixels or voxels located within boundaries of the one or more anatomies of interest have non-zero values or an image with a Gaussian-like band defined surrounding boundaries of the one or more anatomies of interest.

6. The method of claim 1, wherein the target medical image analysis task is lesion detection, segmentation, and characterization, and the final output image is a multi-label mask image in which only pixels or voxels within lesion boundaries of one or more lesions have non-zero values assigned to each of the one or more lesions corresponding to a lesion type for each lesion.

7. The method of claim 1, wherein the target medical image analysis task is an image denoising task, and the final output image is a reduced noise image of the input medical image.

8. The method of claim 1, wherein the input medical image is a medical image in a source domain, the target medical image analysis task is cross-domain image synthesis, and the final output image is a synthesized medical image in a target domain corresponding to the input medical image.

9. The method of claim 1, wherein receiving the input medical image includes receiving the input medical image in a pair of input medical images acquired using different imaging modalities, the target medical image analysis task is registration of the pair of input medical images, and the final output image is a deformation field that provides the registration between the pair of input medical images.

10. The method of claim 1, wherein receiving the input medical image includes receiving the input medical image in a set of input medical images, the target medical image analysis task is a quantitative parametric mapping task, and the final output image is a set of quantitative parameters that generate the set of input medical images given a pointwise generative model.

11. The method of claim 2, further comprising, in a training stage prior to receiving the input medical image of the patient:
  defining a type of output image that provides the result of the target medical image analysis task;
  receiving a plurality of input training images;
  receiving or generating corresponding output training images for the plurality of input training images, resulting in a training set of paired input and output training images; and
  training each of the DI2INs of the part-based DI2IN by learning weight parameters of the deep learning network that models the unary and pairwise terms of the CRF energy function that result in a maximum likelihood for the corresponding part of the paired input and output training images over the training set of paired input and output training images.

12. The method of claim 2, wherein automatically generating, for each of the plurality of parts of the input medical image, a respective output image that provides a result of the target medical image analysis task on that part of the input medical image using the corresponding one of the plurality of trained DI2INs comprises:
  estimating, for each of the plurality of parts of the input medical image, a respective output image that maximizes a likelihood of the CRF energy function given the part of the input medical image and a set of learned weight parameters of the respective trained deep learning network, wherein the respective trained deep learning network calculates the unary and pairwise terms of the CRF energy function based on the part of the input medical image, the estimated respective output image, and the set of learned weight parameters of the respective trained deep learning network.

13. An apparatus for automatically performing a medical image analysis task on a medical image of a patient, comprising:
  means for receiving an input medical image of a patient; and
  means for automatically generating an output image that provides a result of a target medical image analysis task on the input medical image using a trained part-based deep image-to-image network (DI2IN) comprising a plurality of trained DI2INs corresponding to a plurality of parts of the input medical image, comprising:
    means for dividing the input medical image into the plurality of parts,
    means for automatically generating, for each of the plurality of parts of the input medical image, a respective output image that provides a result of the target medical image analysis task on that part of the input medical image using the corresponding one of the plurality of trained DI2INs, and
    means for aggregating the respective output images that provide the results of the target medical image analysis task on each of the plurality of parts of the input medical image to generate a final output image that provides the result of the target medical image analysis task on the input medical image.

14. The apparatus of claim 13, wherein each of the trained DI2INs uses a conditional random field (CRF) energy function to estimate the respective output image based on the corresponding one of the plurality of parts of the input medical image and uses a respective trained deep learning network to model unary and pairwise terms of the CRF energy function.

15. The apparatus of claim 13, wherein the target medical image analysis task is one of anatomic landmark detection, anatomic structure detection, anatomic structure segmentation, lesion detection, segmentation or characterization, image denoising, cross-domain image synthesis, cross-modality image registration, or quantitative parameter mapping.

16. The apparatus of claim 14, further comprising means for training the D121N comprising:
  means for defining a type of output image that provides the result of the target medical image analysis task;
  means for receiving a plurality of input training images;
  means for generating corresponding output training images for the plurality of input training images, resulting in a training set of paired input and output training images; and
  means for training each of the DI2INs of the part-based DI2IN by learning weight parameters of the deep learning network that models the unary and pairwise terms of the CRF energy function that result in a maximum likelihood for the corresponding part of the paired input and output training images over the training set of paired input and output training images.

17. The apparatus of claim 14, wherein the means for automatically generating, for each of the plurality of parts of the input medical image, a respective output image that provides a result of the target medical image analysis task on that part of the input medical image using the corresponding one of the plurality of trained DI2INs comprises:
  means for estimating, for each of the plurality of parts of the input medical image, a respective output image that maximizes a likelihood of the CRF energy function given the part of the input medical image and a set of learned weight parameters of the respective trained deep learning network, wherein the respective trained deep learning network calculates the unary and pairwise terms of the CRF energy function based on the part of the input medical image, the estimated respective output image, and the set of learned weight parameters of the respective trained deep learning network.

18. A non-transitory computer readable medium storing computed program instructions for automatically performing a medical image analysis task on a medical image of a patient, the computer program instructions when executed by a processor cause the processor to perform operations comprising:
  receiving an input medical image of a patient; and
  automatically generating an output image that provides a result of a target medical image analysis task on the input medical image using a trained part-based deep image-to-image network (DI2IN) comprising a plurality of trained DI2INs corresponding to a plurality of parts of the input medical image by:
dividing the input medical image into the plurality of parts, automatically generating, for each of the plurality of parts of the input medical image, a respective output image that provides a result of the target medical image analysis task on that part of the input medical image using the corresponding one of the plurality of trained DI2INs, and
aggregating the respective output images that provide the results of the target medical image analysis task on each of the plurality of parts of the input medical image to generate a final output image that provides the result of the target medical image analysis task on the input medical image.

19. The non-transitory computer readable medium of claim 18, wherein each of the trained DI2INs uses a conditional random field (CRF) energy function to estimate the respective output image based on the corresponding one of the plurality of parts of the input medical image and uses a respective trained deep learning network to model unary and pairwise terms of the CRF energy function.

20. The non-transitory computer readable medium of claim 18, wherein the target medical image analysis task is one of anatomic landmark detection, anatomic structure detection, anatomic structure segmentation, lesion detection, segmentation or characterization, image denoising, cross-domain image synthesis, cross-modality image registration, or quantitative parameter mapping.

21. The non-transitory computer readable medium of claim 19, wherein the operations further comprise, in a training stage prior to receiving the input medical image of the patient:
defining a type of output image that provides the result of the target medical image analysis task;
receiving a plurality of input training images;
receiving or generating corresponding output training images for the plurality of input training images, resulting in a training set of paired input and output training images; and
training each of the DI2INs of the part-based DI2IN by learning weight parameters of the deep learning network that models the unary and pairwise terms of the CRF energy function that result in a maximum likelihood for the corresponding part of the paired input and output training images over the training set of paired input and output training images.

22. The non-transitory computer readable medium of claim 19, wherein automatically generating, for each of the plurality of parts of the input medical image, a respective output image that provides a result of the target medical image analysis task on that part of the input medical image using the corresponding one of the plurality of trained DI2INs comprises:
estimating, for each of the plurality of parts of the input medical image, a respective output image that maximizes a likelihood of the CRF energy function given the part of the input medical image and a set of learned weight parameters of the respective trained deep learning network, wherein the respective trained deep learning network calculates the unary and pairwise terms of the CRF energy function based on the part of the input medical image, the estimated respective output image, and the set of learned weight parameters of the respective trained deep learning network.

* * * * *